(12) United States Patent
Nuriya (10) Patent No.: US 11,971,367 B2
(45) Date of Patent: Apr. 30, 2024

(54) INSPECTION DEVICE AND INSPECTION METHOD

(71) Applicant: JUKI CORPORATION, Tama (JP)

(72) Inventor: Yasuyuki Nuriya, Tokyo (JP)

(73) Assignee: JUKI CORPORATION, Tama (JP)

( * ) Notice: Subject to any disclaimer, the term of this patent is extended or adjusted under 35 U.S.C. 154(b) by 24 days.

(21) Appl. No.: 17/108,300

(22) Filed: Dec. 1, 2020

(65) Prior Publication Data

US 2021/0172884 A1 Jun. 10, 2021

(30) Foreign Application Priority Data

Dec. 2, 2019 (JP) ................................ 2019-218173

(51) Int. Cl.
*G01N 21/956* (2006.01)
*G01N 21/88* (2006.01)
*G06T 1/00* (2006.01)
*G06T 7/00* (2017.01)
*G06T 7/12* (2017.01)

(52) U.S. Cl.
CPC ... *G01N 21/95684* (2013.01); *G01N 21/8806* (2013.01); *G01N 21/95607* (2013.01); *G06T 1/0007* (2013.01); *G06T 7/001* (2013.01); *G06T 7/12* (2017.01); *G01N 2021/95615* (2013.01); *G01N 2021/95646* (2013.01); *G06T 2207/30144* (2013.01); *G06T 2207/30152* (2013.01)

(58) Field of Classification Search
CPC . G01N 2021/95646; G01N 2021/8887; G01N 2021/95615; G01N 21/8806; G01N 21/8851; G01N 21/95607; G01N 21/95684; G01N 2021/8809; G01N 2021/8845; G01N 21/9515; G01N 21/956
See application file for complete search history.

(56) References Cited

U.S. PATENT DOCUMENTS

| 6,947,151 | B2 | 9/2005 | Fujii et al. |
| 2002/0005498 | A1 | 1/2002 | Murakoshi et al. |
| 2005/0209822 | A1 | 9/2005 | Ishiba et al. |

(Continued)

FOREIGN PATENT DOCUMENTS

| CN | 104160242 A | 11/2014 |
| CN | 108240990 A * | 7/2018 |

(Continued)

OTHER PUBLICATIONS

Japanese Office Action issued May 23, 2023 in Application No. 2019-218173.

(Continued)

*Primary Examiner* — Tarifur R Chowdhury
*Assistant Examiner* — Amanda Merlino
(74) *Attorney, Agent, or Firm* — Faegre Drinker Biddle & Reath LLP (57) ABSTRACT

An inspection device includes an image acquisition unit configured to acquire images obtained by imaging, under at least two illumination conditions with different brightness, solder normally printed on a substrate, and an image processing unit configured to specify a shape of the solder based on a difference in brightness between the images acquired by the image acquisition unit, and generate, based on the shape of the solder, inspection data used for inspecting a state of the solder printed on the substrate.

18 Claims, 10 Drawing Sheets

(56) References Cited

U.S. PATENT DOCUMENTS

2014/0372075 A1   12/2014  Kojima et al.
2017/0219495 A1    8/2017  Nagata et al.
2020/0292465 A1*  9/2020  Konno ................. G01B 11/303

FOREIGN PATENT DOCUMENTS

| | | | |
|---|---|---|---|
| CN | 110108712 A | * | 8/2019 |
| JP | H08-261732 A | | 10/1996 |
| JP | 2002-168610 A | | 6/2002 |
| JP | 2003-207461 A | | 7/2003 |
| JP | 2005-286309 A | | 10/2005 |
| JP | 2009-128056 A | | 6/2009 |
| JP | 5566707 B2 | | 8/2014 |
| JP | 2015-210226 A | | 11/2015 |
| JP | 2018-207023 A | | 12/2018 |
| TW | 201612504 A | | 4/2016 |

OTHER PUBLICATIONS

Japanese Office Action issued Aug. 1, 2023 in Application No. 2019-218173.
Japanese Office Action issued Oct. 17, 2023 in Application No. 2019-218173.
Taiwanese Office Action issued Feb. 2, 2024 in Application No. 109142455.

* cited by examiner

INSPECTION DEVICE AND INSPECTION METHOD

CROSS-REFERENCE TO RELATED APPLICATIONS

This application is based upon and claims the benefit of priority from prior Japanese patent application No. 2019-218173, filed on Dec. 2, 2019, the entire contents of which are incorporated herein by reference.

TECHNICAL FIELD

The present disclosure relates to an inspection device and an inspection method

BACKGROUND ART

In a manufacturing process of electronic equipment, a shape of solder printed on a substrate is inspected by using an appearance inspection device. The appearance inspection device determines quality of a state of the solder by using an image obtained by imaging the state of the solder printed on the substrate.

For example, in Japanese Patent No. 5566707, an inspection window is set in a region to be inspected, and various determinations are made on an electronic component in the set inspection window.

The appearance inspection of the solder printed on the substrate can be automatically performed since a position where the solder is printed can be specified if design data (for example, Gerber data) including wiring information of the substrate is available. However, when the design data is not available, it is necessary to manually set an inspection window to specify an inspection position.

Therefore, when the design data is not available, it takes time to set the inspection window, and the work efficiency of the solder appearance inspection process may deteriorate.

SUMMARY OF INVENTION

According to the present disclosure, there is provided an inspection device comprises an image acquisition unit configured to acquire images obtained by imaging, under at least two illumination conditions with different brightness, solder normally printed on a substrate, and an image processing unit configured to specify a shape of the solder based on a difference in brightness between the images acquired by the image acquisition unit, and generate, based on the shape of the solder, inspection data used for inspecting a state of the solder printed on the substrate.

According to the present disclosure, the work efficiency of appearance inspection of the solder printed on the substrate is improved.

DESCRIPTION OF EMBODIMENTS

Hereinafter, an embodiment of the present disclosure will be described with reference to the drawings, but the present disclosure is not limited thereto. Components of the embodiment to be described below can be combined as appropriate. A part of the components may not be used.

In the embodiment, a XYZ Cartesian coordinate system is defined, and a positional relationship of each part will be described with reference to the XYZ Cartesian coordinate system. A direction parallel to an X-axis in a horizontal plane is defined as an X direction. A direction parallel to a Y-axis in the horizontal plane that is orthogonal to the X-axis is defined as a Y direction. A direction parallel to a Z-axis that is orthogonal to the horizontal plane is defined as a Z direction. A plane including the X-axis and the Y-axis is appropriately referred to as an XY plane. The XY plane is parallel to the horizontal plane. The Z-axis is parallel to a vertical line. The Z direction is an upper-lower direction. A +Z direction is an upper direction and a −Z direction is a lower direction.

[Production Line]

Figure 1:
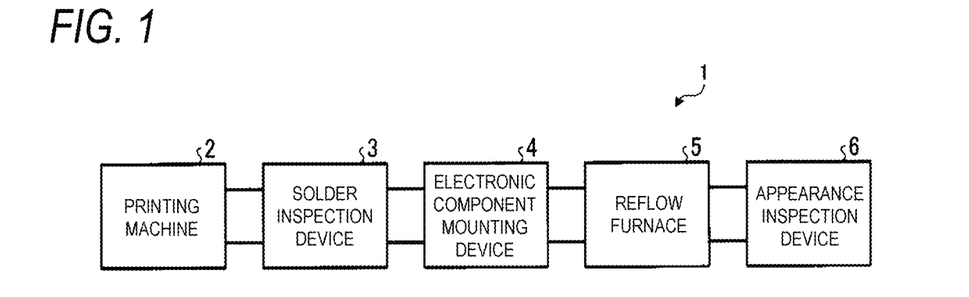
FIG. 1 is a diagram schematically showing a production line of an electronic equipment according to an embodiment.

FIG. 1 is a diagram schematically showing a production line 1 of electronic equipment according to an embodiment. As shown in FIG. 1, the production line 1 includes a printing machine 2, a solder inspection device 3, an electronic component mounting device 4, a reflow furnace 5, and an appearance inspection device 6.

The printing machine 2 prints cream solder on a substrate on which electronic components are to be mounted.

The solder inspection device 3 determines quality of a state of the cream solder printed on the substrate. The solder inspection device 3 generates, based on an image of cream solder normally printed on the substrate, inspection data for determining quality of the state of the cream solder. The solder inspection device 3 determines, based on the inspection data, the quality of the state of the cream solder printed on the substrate. The solder inspection device 3 determines the quality of the state of the cream solder by comparing the inspection data with the state of the cream solder printed on the substrate.

The electronic component mounting device 4 mounts electronic components on the substrate on which the cream solder is printed. The reflow furnace 5 heats the substrate on which the electronic components are mounted to melt the cream solder. The melted cream solder in the reflow furnace 5 is cooled, and thus the electronic components are soldered to the substrate.

The appearance inspection device 6 inspects whether the electronic components are suitably mounted on the substrate. The appearance inspection device 6 inspects whether correct electronic components are mounted on the substrate.

[Solder Inspection Device]

Figure 2:
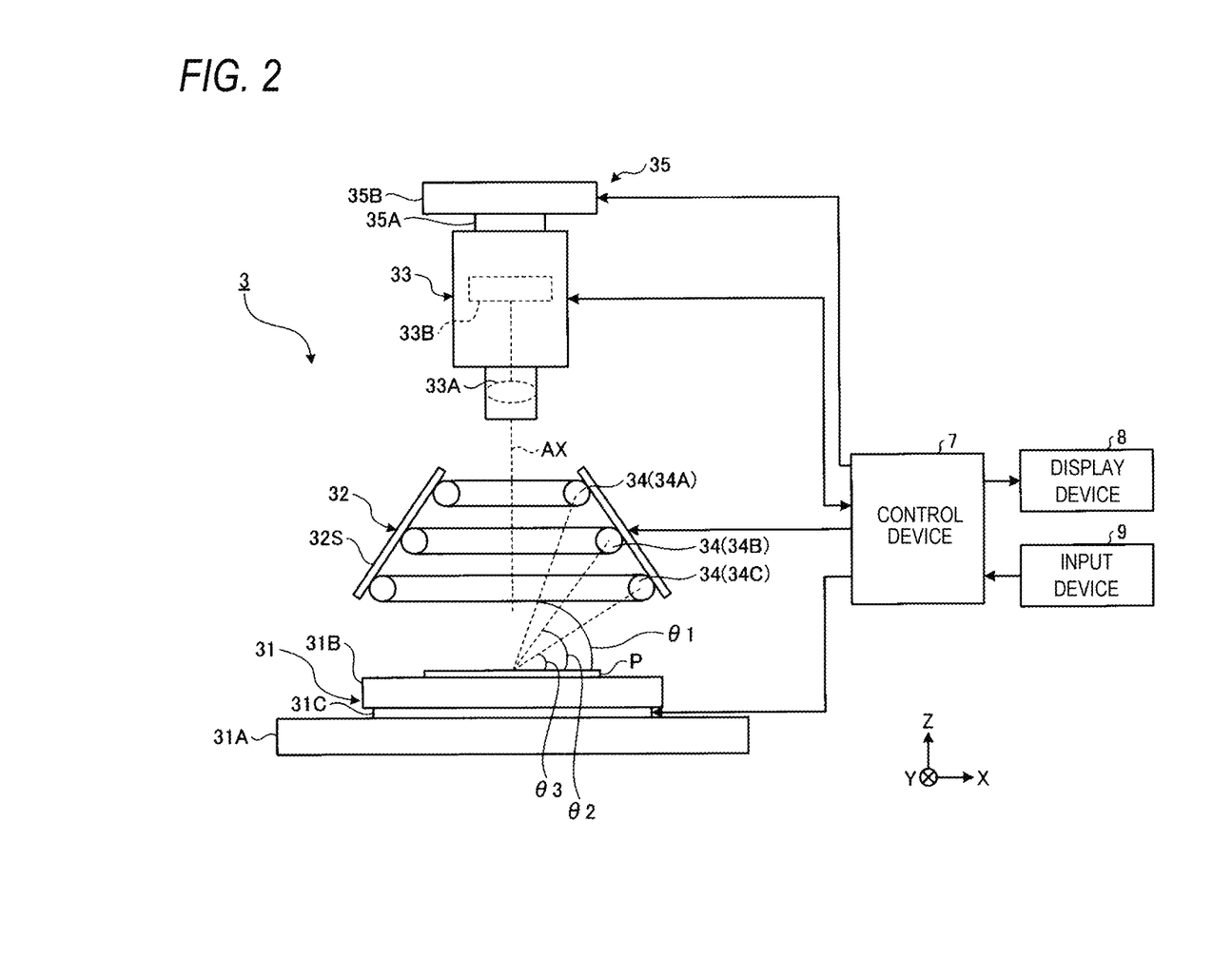
FIG. 2 is a diagram schematically showing a solder inspection device according to the embodiment.

A configuration of the solder inspection device 3 according to the present embodiment will be described with reference to FIG. 2. FIG. 2 is a schematic diagram showing an example of the configuration of the solder inspection device 3 according to the embodiment.

As shown in FIG. 2, the solder inspection device 3 includes a substrate holding device 31 that holds a substrate P on which cream solder is printed; an illumination device 32 by which the cream solder printed on the substrate P can be illuminated under a plurality of illumination conditions; an imaging device 33 that images the cream solder mounted on the substrate P; a control device 7 including a computer system; a display device 8 capable of displaying display data; and an input device 9 that is operated by an operator.

The substrate holding device 31 holds the substrate P on which the cream solder is printed. The substrate holding device 31 includes a base member 31A, a holding member 31B that holds the substrate P, and an actuator 31C that generates power to move the holding member 31B. The base member 31A movably supports the holding member 31B. The holding member 31B holds the substrate P such that the cream solder printed on a surface of the substrate P and the imaging device 33 face each other. In a state of holding the substrate P, the holding member 31B is movable in an X direction by operating the actuator 31C. For example, when the holding member 31B carries in the substrate P, position adjustment between the imaging device 33 and the substrate P in the X direction is performed by operating the actuator 31C. As to be described later, the positions of the imaging device 33 and the substrate P in the XY direction when the imaging device 33 images the substrate P can be adjusted by moving the imaging device 33 in the XY direction.

The illumination device 32 illuminates the cream solder printed on the substrate P with illumination light while the substrate P is held by the substrate holding device 31. The cream solder is illuminated under each of the plurality of illumination conditions of the illumination device 32. The illumination device 32 is disposed above the substrate holding device 31. The illumination device 32 includes a plurality of light sources 34 by which the cream solder can be illuminated under different illumination conditions, and a support member 32S that supports the plurality of light sources 34.

Each of the plurality of light sources 34 has an annular shape. As the plurality of light sources 34, for example, light emitting diodes (LEDs) are exemplified. The plurality of light sources 34 emit white light as illumination light. The support member 32S is disposed at least on a part of a periphery of the plurality of light sources 34. The illumination light emitted by the plurality of light sources 34 is not limited to white light, and may be red light, blue light, or the like.

In the embodiment, the light sources 34 include a first light source 34A having a first inner diameter, a second light source 34B having a second inner diameter larger than the first inner diameter, and a third light source 34C having a third inner diameter larger than the second inner diameter. Among the plurality of light sources 34, the first light source 34A is disposed at a position farthest from the substrate holding device 31, the second light source 34B is disposed at a position farthest from the substrate holding device 31 next to the first light source 34A, and the third light source 34C is disposed at a position closest to the substrate holding device 31. That is, among the plurality of light sources 34, the first light source 34A is disposed at the highest position, the second light source 34B is disposed at the highest position next to the first light source 34A, and the third light source 34C is disposed at the lowest position.

The illumination condition includes an incident angle $\theta$ of the illumination light incident on the cream solder. An incident angle $\theta 1$ at which illumination light emitted from the first light source 34A is incident on the cream solder, an incident angle $\theta 2$ at which illumination light emitted from the second light source 34B is incident on the cream solder, and an incident angle $\theta 3$ at which illumination light emitted from the third light source 34C is incident on the cream solder are different. The cream solder printed on the substrate P is irradiated with the illumination light of the illumination device 32 at each of the plurality of incident angles $\theta$.

In the following description, the illumination condition for illuminating the cream solder with the illumination light emitted from the first light source 34A may be appropriately referred to as a first illumination condition. The illumination condition for illuminating the cream solder with the illumination light emitted from the second light source 34B may be appropriately referred to as a second illumination condition. The illumination condition for illuminating the cream solder with the illumination light emitted from the third light source 34C may be appropriately referred to as a third illumination condition.

When the illumination light is emitted from the first light source 34A, the illumination light is not emitted from any of the second light source 34B and the third light source 34C. When the illumination light is emitted from the second light source 34B, the illumination light is not emitted from any of the third light source 34C and the first light source 34A. When the illumination light is emitted from the third light source 34C, the illumination light is not emitted from any of the first light source 34A and the second light source 34B.

The imaging device 33 images the cream solder mounted on the substrate P and acquires an image of the cream solder. The imaging device 33 is disposed above the illumination device 32. The imaging device 33 includes an optical system 33A and an image sensor 33B that acquires the image of cream solder via the optical system 33A. In the embodiment, an optical axis AX of the optical system 33A is parallel to the Z-axis. The optical axis AX of the optical system 33A is disposed inside the annular light sources 34. As the image sensor 33B, at least one of a Couple Charged Device (CCD) image sensor and a Complementary Metal Oxide Semiconductor (CMOS) image sensor is exemplified. The imaging device 33 can acquire a color image of the cream solder. The imaging device 33 may be configured by a monochrome camera. In this case, the imaging device 33 acquires a monochrome image of the cream solder.

The imaging device 33 is disposed, for example, on a moving device 35 above the illumination device 32. The moving device 35 has a holding member 35A and an actuator 35B. The holding member 35A supports a head portion of the imaging device 33. In a state of supporting the imaging device 33, the holding member 35A is movable in the XY plane by operating the actuator 35B. By moving the holding member 35A in the XY plane in a state where the imaging device 33 is instructed, position adjustment between the imaging device 33 and the substrate P in the XY plane during imaging of the substrate P can be performed. When the imaging device 33 moves in the XY plane, the illumination device 32 also moves in the XY plane together with the imaging device 33.

The imaging device 33 images the cream solder in a state where the cream solder is illuminated by the illumination device 32. The imaging device 33 images the cream solder illuminated under each of the first illumination condition, the second illumination condition, and the third illumination condition. The light sources 34 are disposed outside a field of view of the imaging device 33. The imaging device 33 images the cream solder through a space inside the light sources 34.

The holding member 35A moves in the XY plane. The holding member 35A moves such that the cream solder printed on the substrate P is disposed in the field of view of the imaging device 33. The imaging device 33 images each of a plurality of regions of the substrate P each time a relative position in the XY plane between the substrate P and the field of view of the imaging device 33 is adjusted. Therefore, the imaging device 33 can acquire images of the cream solder on the entire substrate P.

The control device 7 controls the substrate holding device 31, the illumination device 32, and the imaging device 33. The control device 7 includes an arithmetic processing device including a processor such as a Central Processing Unit (CPU); and a storage device including a storage and a memory such as a Read Only Memory (ROM) or a Random Access Memory (RAM). The arithmetic processing device performs arithmetic processing according to a computer program stored in the storage device. Further, the control device 7 may be implemented by, for example, an integrated circuit such as an Application Specific Integrated Circuit (ASIC) or a Field Programmable Gate Array (FPGA).

The control device 7 controls the substrate holding device 31 to adjust the relative position between the substrate P held by the holding member 31B and the field of view of the imaging device 33. The control device 7 controls the illumination device 32 to adjust the illumination condition of the cream solder mounted on the substrate P. The control device 7 controls the imaging device 33 to control imaging conditions including at least one of a timing of imaging the cream solder, a shutter speed, and an aperture of the optical system 33A.

The control device 7 controls the illumination device 32 to illuminate the cream solder mounted on the substrate P in each of the plurality of illumination conditions. The control device 7 controls the imaging device 33 to acquire a plurality of images of the cream solder illuminated under the plurality of illumination conditions.

The control device 7 controls the illumination device 32 to illuminate, in the first illumination condition, the cream solder with the illumination light emitted from the first light source 34A. The control device 7 controls the illumination device 32 to illuminate, in the second illumination condition, the cream solder with the illumination light emitted from the second light source 34B. The control device 7 controls the illumination device 32 to illuminate, in the third illumination condition, the cream solder with the illumination light emitted from the third light source 34C. The control device 7 acquires an image of the cream solder when illuminated under the first illumination condition, an image of the cream solder when illuminated under the second illumination condition, and an image of the cream solder when illuminated under the third illumination condition. The image of the cream solder when illuminated under the first illumination condition may be referred to as a first image. The image of the cream solder when illuminated under the second illumination condition may be referred to as a second image. The image of the cream solder when illuminated under the third illumination condition may be referred to as a third image.

The control device 7 generates a difference image in which a difference in brightness between the first image and the second image is calculated. The control device 7 generates a difference image in which a difference in brightness between the first image and the third image is calculated. The control device 7 generates a difference image in which a difference in brightness between the second image and the third image is calculated. The brightness of an image is brilliance, luminance, or the like of the image.

The control device 7 executes binarization processing of converting the generated difference image into a two-step color tone of black and white, and generates a binary image. For example, the control device 7 converts a region having luminance exceeding a predetermined threshold value into white and a region having luminance below a predetermined threshold value into black for each pixel in the difference image, so as to generate the binary image. In the present embodiment, the color of the binary image is not limited to black and white, and other color combinations may be used.

The control device 7 extracts an edge of the cream solder based on the binary image. The control device 7 extracts the black and white regions as the edge of the cream solder based on the binary image. The control device 7 specifies a shape of the cream solder based on the extracted edge.

The control device 7 generates, based on the shape of the cream solder, inspection data for determining quality of the shape of the cream solder. The control device 7 generates, based on the shape of the cream solder normally printed on the substrate, inspection data for determining the quality of the shape of the cream solder.

The control device 7 determines the quality of the shape of the cream solder printed on the substrate. The control device 7 determines, based on the inspection data, the quality of the shape of the cream solder printed on the substrate.

The display device 8 has a display screen for displaying display data. As the display device 8, a flat panel display such as a Liquid Crystal Display (LCD) or an Organic Electroluminescence Display (OELD) is exemplified. An operator can check the display screen of the display device 8. For example, the operator can check a state of the cream solder printed on the substrate P on the display screen of the display device 8.

The input device 9 is operated by an operator. The input device 9 generates input data by being operated by the operator. The input data generated by the input device 9 is output to the control device 7. As the input device 9, at least one of a computer keyboard, a mouse, a button, a switch, and a touch panel is exemplified.

[Control Device]

Figure 3:
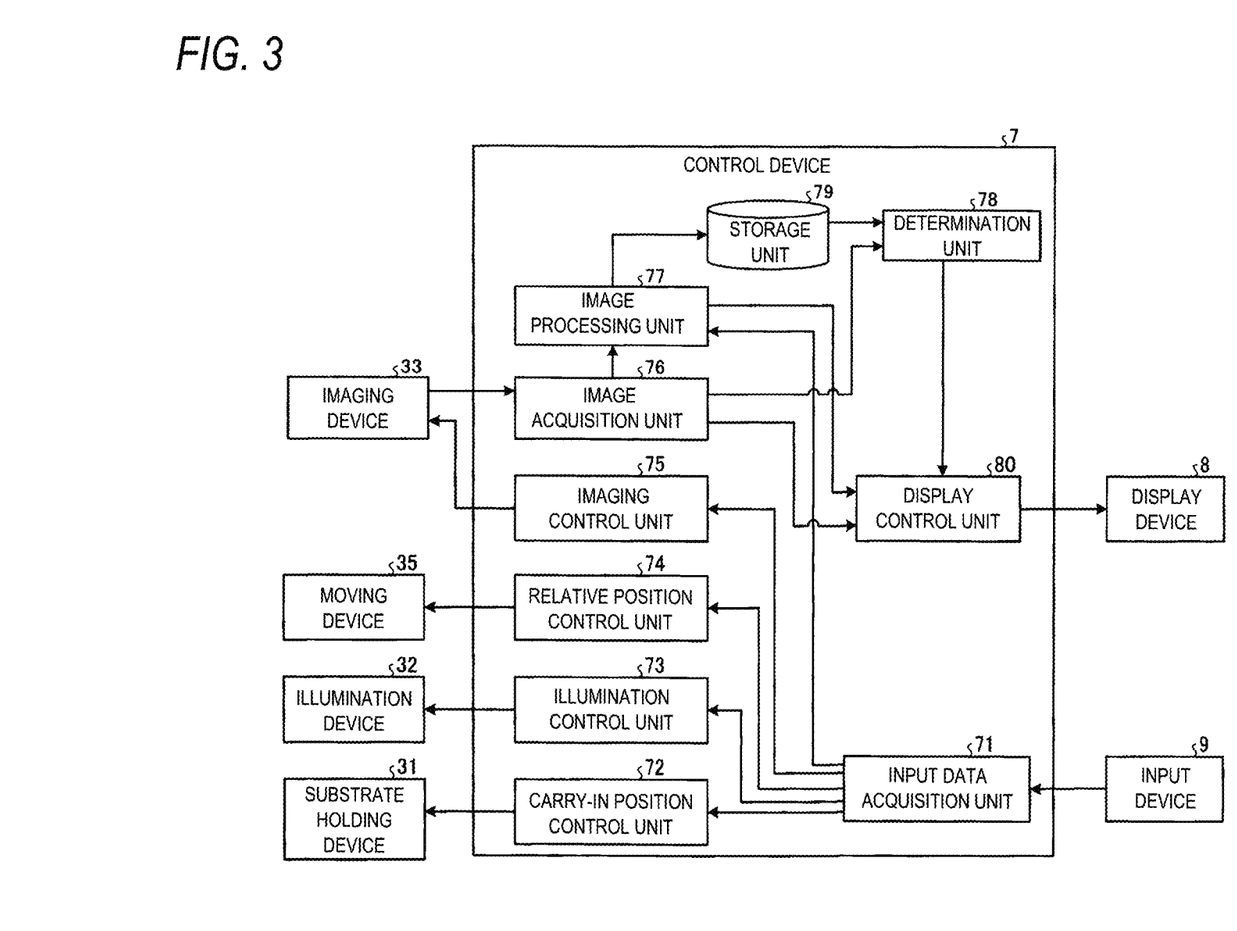
FIG. 3 is a functional block diagram showing an example of a configuration of a control device according to the embodiment.

A configuration of the control device according to the present embodiment will be described with reference to FIG. 3. FIG. 3 is a functional block diagram showing an example of the configuration of the control device according to the present embodiment.

As shown in FIG. 3, the control device 7 includes an input data acquisition unit 71, a carry-in position control unit 72, an illumination control unit 73, a relative position control unit 74, an imaging control unit 75, an image acquisition unit 76, an image processing unit 77, a determination unit 78, a storage unit 79, and a display control unit 80.

The input data acquisition unit 71 acquires the input data generated by operating the input device 9.

The carry-in position control unit 72 outputs a control instruction to the substrate holding device 31 to adjust a relative position in the X direction between the imaging device 33 and the holding member 31B that holds the substrate P during carry-in of the substrate P. The carry-in position control unit 72 adjusts a relative position in the X direction between the cream solder printed on the substrate P and the field of view of the imaging device 33 during carry-in of the substrate P.

The illumination control unit 73 outputs a control instruction to the illumination device 32 to adjust the illumination condition when the cream solder printed on the substrate P is illuminated with the illumination light. The illumination control unit 73 controls the illumination device 32 such that the cream solder is to be illuminated under at least two of the first illumination condition, the second illumination condition, and the third illumination condition.

The relative position control unit 74 outputs a control instruction to the moving device 35 to cause the moving device 35 to move in the XY plane, and thus the relative position in the XY plane between the holding member 31B that holds the substrate P and the imaging device 33 is adjusted. The relative position control unit 74 adjusts the relative position in the XY plane between the cream solder printed on the substrate P and the field of view of the imaging device 33.

The imaging control unit 75 outputs a control instruction to the imaging device 33 to control imaging conditions including at least one of the timing of imaging the cream solder, the shutter speed, and the aperture of the optical system 33A.

The image acquisition unit 76 acquires a plurality of images of the cream solder in a state of being printed on the substrate P while being illuminated by the illumination device 32 under the plurality of illumination conditions. The image acquisition unit 76 acquires the plurality of images of the cream solder that is imaged by the imaging device 33 while being illuminated under the plurality of illumination conditions. The image acquisition unit 76 acquires the first image of the cream solder when illuminated under the first illumination condition, the second image of the cream solder when illuminated under the second illumination condition, and the third image of the cream solder when illuminated under the third illumination condition.

The image processing unit 77 performs image processing on the images acquired by the image acquisition unit 76. The image processing unit 77 specifies the shape of the cream solder based on a difference in brightness between the images acquired by the image acquisition unit 76. The image processing unit 77 generates, based on the shape of the cream solder, inspection data to be used for inspecting a state of the cream solder printed on the substrate P.

Specifically, the image processing performed by the image processing unit 77 includes processing of calculating the difference in brightness between two images among the first image, the second image, and the third image acquired by the image acquisition unit 76, and generating a difference image. The image processing includes processing of generating a binary image based on the difference image. The image processing includes processing of extracting edges of regions having different colors based on the binary image to specify the shape of the cream solder. The image processing includes processing of generating, based on the specified shape of the cream solder, inspection data for determining the quality of the state of the cream solder printed on the substrate. The inspection data is generated based on an image of the substrate P on which the cream solder is normally printed. The image processing unit 77 stores the generated inspection data into the storage unit 79.

The determination unit 78 determines various states of the cream solder printed on the substrate. The determination unit 78 determines the quality of the state of the cream solder printed on the substrate. The determination unit 78 compares the image of the cream solder acquired by the image acquisition unit 76 with the inspection data stored in the storage unit 79, and determines the quality of the state of the cream solder printed on the substrate.

The storage unit 79 stores various types of information. The storage unit 79 stores inspection data for determining the quality of the state of the cream solder printed on the substrate. The storage unit 79 can be implemented by, for example, a semiconductor memory element such as a Random Access Memory (RAM) or a flash memory, or a storage device such as a hard disk or a solid state drive.

The display control unit 80 displays various types of display data on the display device 8. The display control unit 80 displays, on the display device 8, the image of the cream solder acquired by the image acquisition unit 76. The display control unit 80 displays, on the display device 8, the image of the cream solder that is image-processed by the image processing unit 77. The display control unit 80 displays a determination result of the determination unit 78 on the display device 8.

[Method for Generating Inspection Data]

Figure 4:
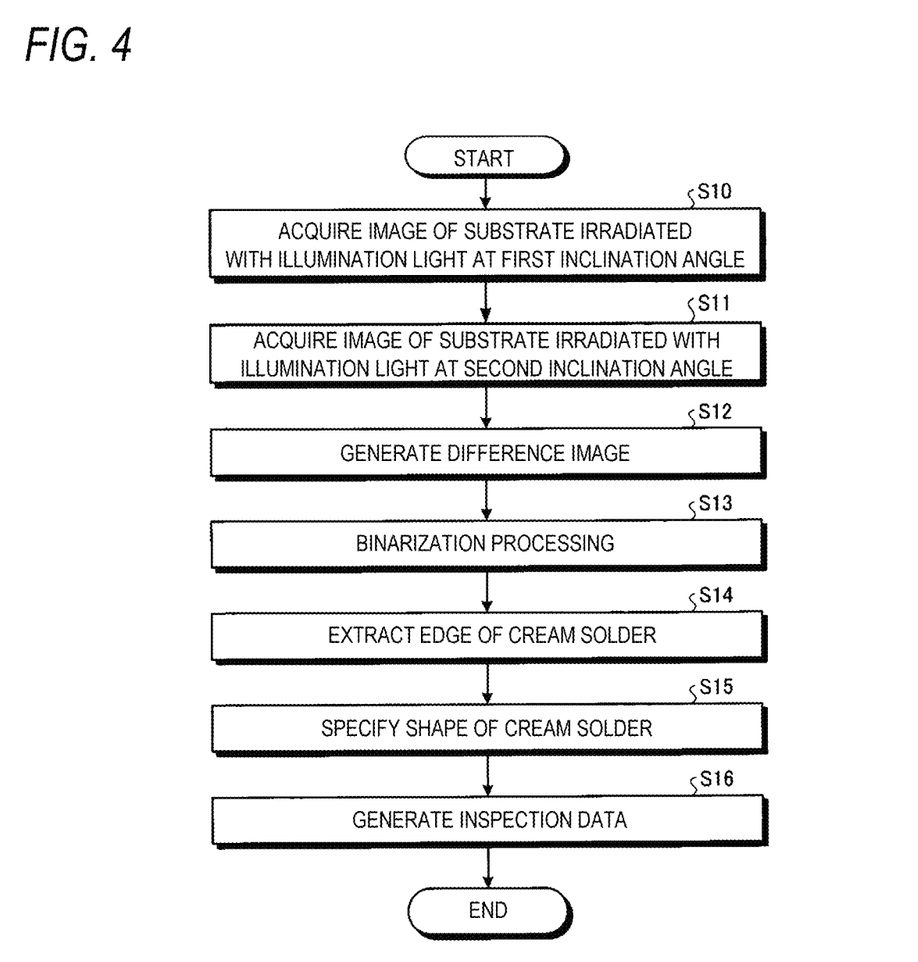
FIG. 4 is a flowchart showing an example of a method for generating inspection data according to the embodiment.

A method for generating the inspection data according to the embodiment will be described with reference to FIG. 4. FIG. 4 is a flowchart showing an example of the method for generating the inspection data according to the embodiment.

The image acquisition unit 76 acquires, from the imaging device 33, an image of the substrate P irradiated with the illumination light at a first inclination angle (step S10). The first inclination angle is a relatively steep angle. In the example shown in FIG. 2, the image acquisition unit 76 acquires, from the imaging device 33, an image of the substrate P irradiated with the illumination light of the first light source 34A. The image acquisition unit 76 acquires, from the imaging device 33, an image of the substrate P irradiated with the illumination light of the second light source 34B.

Figure 5:
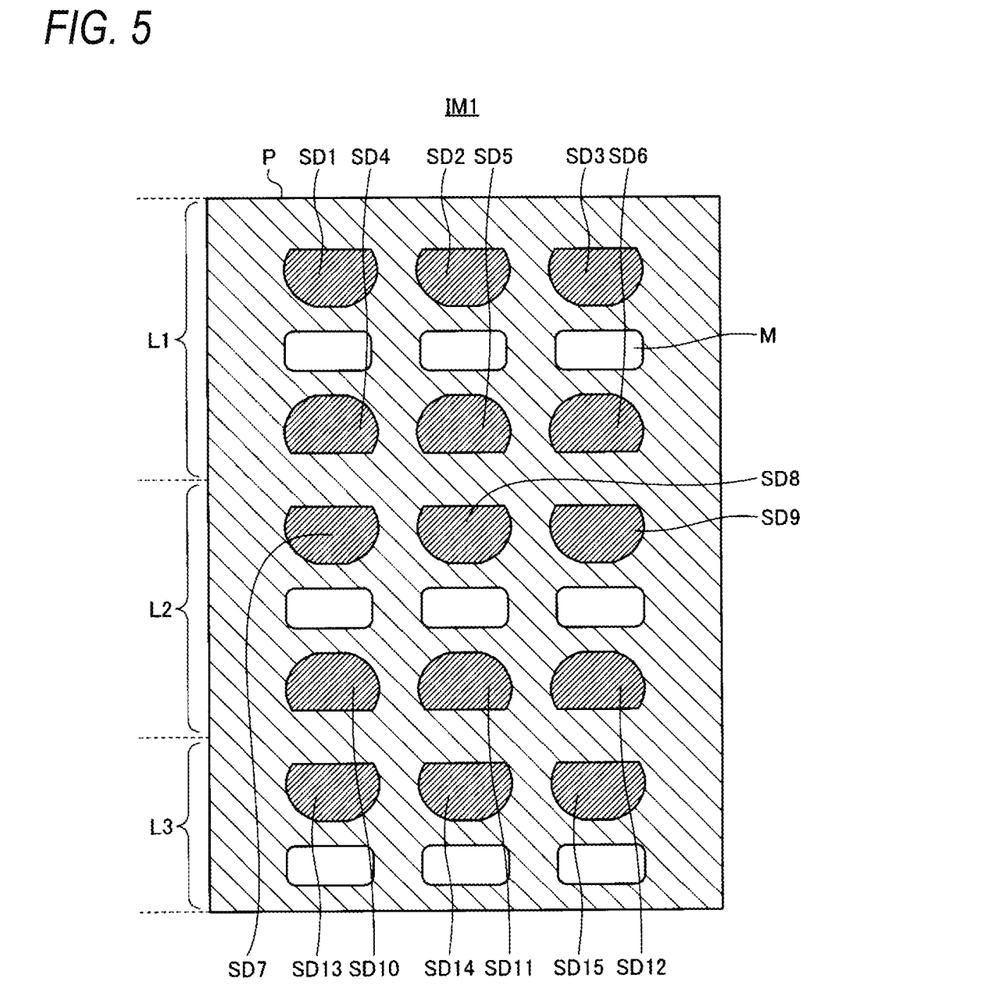
FIG. 5 is a diagram showing an example of a substrate imaged at a first inclination angle according to the embodiment.

FIG. 5 shows an image IM1 of the substrate P that is imaged by the imaging device 33 while being irradiated with the illumination light at the first inclination angle. In FIG. 5, the image of the substrate P that is imaged by the imaging device 33 while being irradiated with the illumination light of the first light source 34A is shown.

The substrate P is divided into a plurality of regions, and the imaging device 33 images the plurality of regions. The imaging device 33 images one region of the substrate P, and images a next region after the next region of the substrate P is moved to the field of view of the imaging device 33 by the substrate holding device 31. For example, the substrate P is divided into three regions, a region L1, a region L2, and a region L3, and the imaging device 33 images the three regions of the substrate P. The image acquisition unit 76 acquires images of the three regions, the region L1, the region L2, and the region L3. The image acquisition unit 76 synthesizes the images of the region L1, the region L2, and the region L3 to obtain an image of the entire substrate P. Cream solder SD1 to SD15 are printed on the substrate P. Silk M is printed on the substrate P as guides. The substrate P does not limit the substrate to which this embodiment is applied.

The image acquisition unit 76 acquires, from the imaging device 33, an image of the substrate P irradiated with the illumination light at a second inclination angle (step S11). The second inclination angle is a relatively gentle angle. In a case where the illumination light of the first inclination angle is from the first light source 34A, the image acquisition unit 76 acquires, from the imaging device 33, the image of the substrate P irradiated with the illumination light of the second light source 34B or the third light source 34C. In a case where the illumination light of the first inclination angle is from the second light source 34B, the image acquisition unit 76 acquires, from the imaging device 33, the image of the substrate P irradiated with the illumination light of the third light source 34C.

Figure 6:
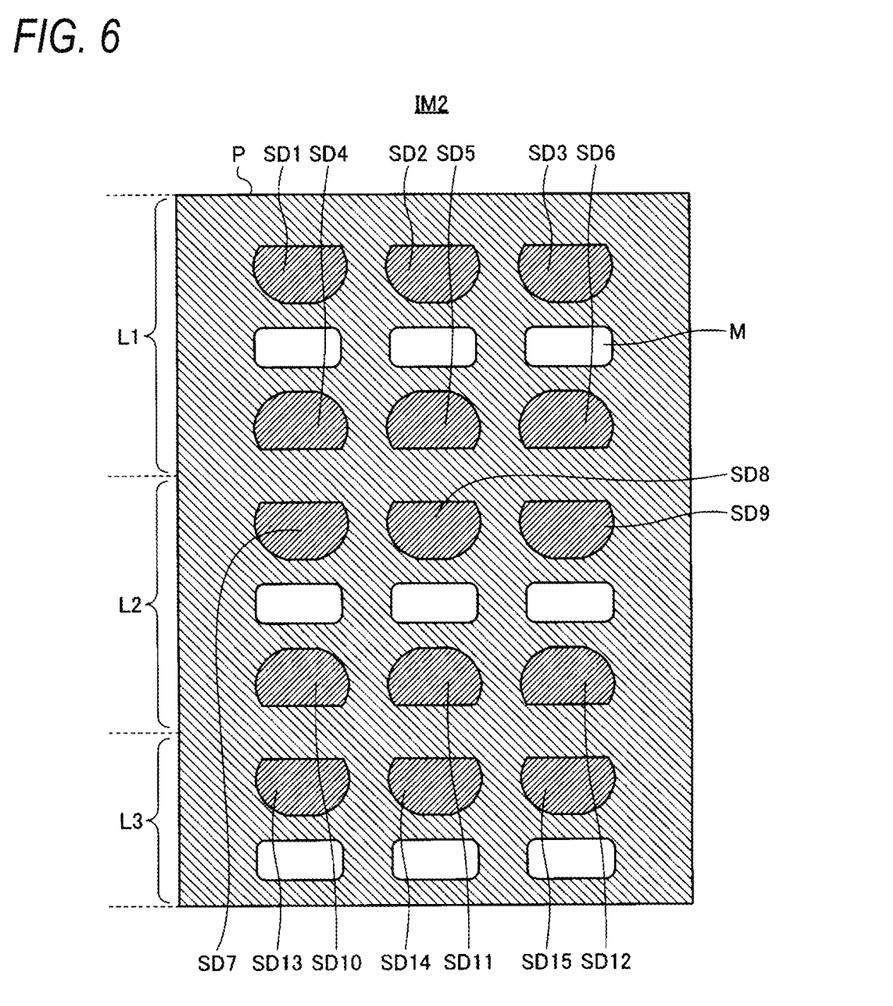
FIG. 6 is a diagram showing an example of a substrate imaged at a second inclination angle according to the embodiment.

FIG. 6 shows an image IM2 of the substrate P that is imaged by the imaging device 33 while being irradiated with the illumination light at the second inclination angle. The method for imaging the substrate P irradiated with the illumination light at the second inclination angle is the same as the method for imaging the substrate P irradiated with the illumination light at the first inclination angle.

When the image IM1 of FIG. 5 is compared with the image IM2 of FIG. 6, a way of reflecting the illumination light is different. In particular, the image IM1 and the image IM2 differ in the way of reflecting the illumination light in the cream solder SD1 to SD15. Specifically, the cream solder SD1 to SD15 in the image IM1 reflect more light than the cream solder SD1 to SD15 in the image IM2.

The image processing unit 77 calculates a difference in brightness between the image of the substrate P irradiated with the illumination light at the first inclination angle and the image of the substrate P irradiated with the illumination light at the second inclination angle, and generates a difference image (step S12). The image processing unit 77 calculates a difference in luminance between the image of the substrate P irradiated with the illumination light at the first inclination angle and the image of the substrate P irradiated with the illumination light at the second inclination angle, and generates a difference image. Taking the image IM1 and the image IM2 as an example, differences in the regions of the cream solder SD1 to SD15 are relatively large, and differences in other regions are relatively small.

The image processing unit 77 performs binarization processing on the generated difference image to generate a binary image (step S13). The image processing unit 77 performs binarization processing for each pixel in the difference image to generate a binary image of black and white.

Figure 7:
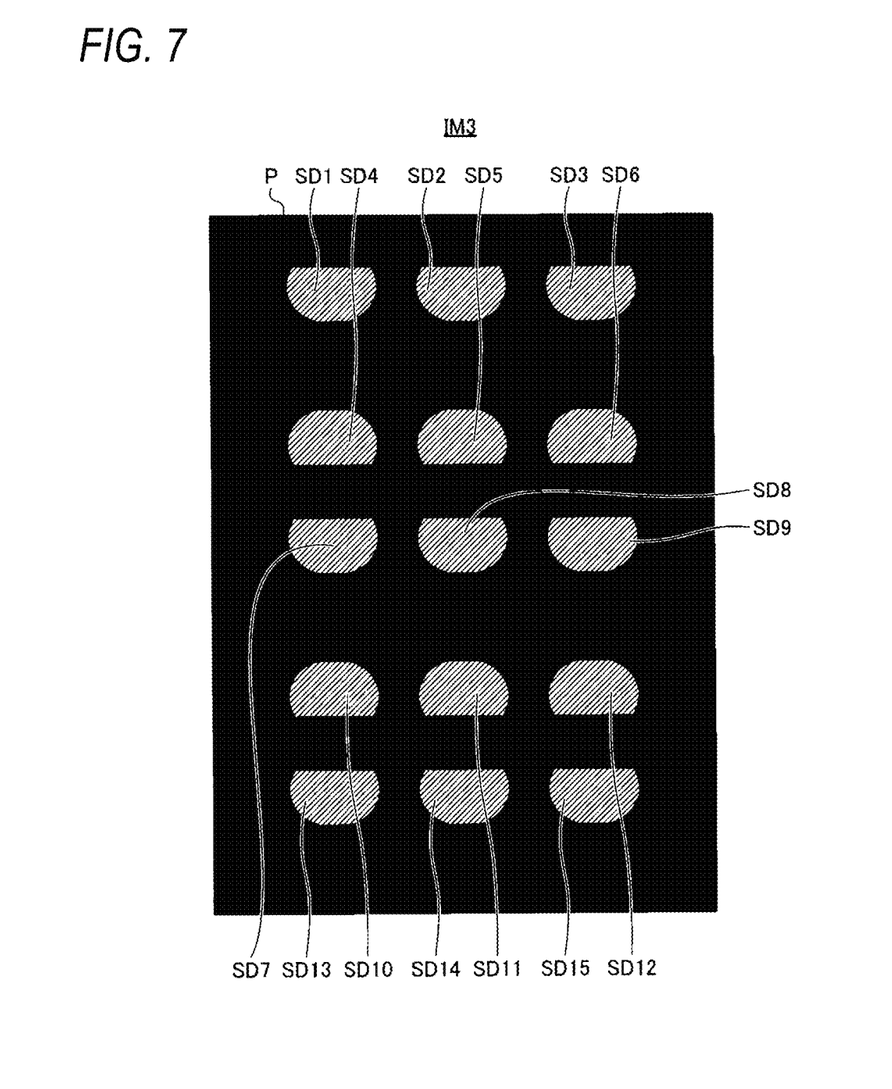
FIG. 7 is a diagram showing an example of a difference image between the image taken at the first inclination angle and an image taken at the second inclination angle according to the embodiment.

FIG. 7 shows an image IM3 obtained by performing binarization processing on the difference image. As shown in FIG. 7, in the image IM3, the regions of the cream solder SD1 to SD15 in which the difference in brightness is large are shown in white, and other regions including the silk M in which the difference in brightness is small are shown in black. That is, by performing the binarization processing on the difference image, regions on which the cream solder is printed are distinguished from other regions.

The image processing unit 77 extracts the edge of the cream solder based on the binary image (step S14). The image processing unit 77 extracts edges of the cream solder SD1 to SD15 by extracting boundaries between the white regions and the black regions based on the image IM3 as shown in FIG. 7.

The image processing unit 77 specifies the shape of the cream solder based on the edge of the cream solder (step S15). In the example shown in FIG. 7, the image processing unit 77 specifies shapes of the cream solder SD1 to SD15.

The image processing unit 77 generates, based on the specified shape of the cream solder, inspection data for inspecting the state of the cream solder printed on the substrate (step S16). Specifically, the image processing unit 77 generates inspection data for determining the quality of the state of the cream solder printed on the substrate.

Figure 8:
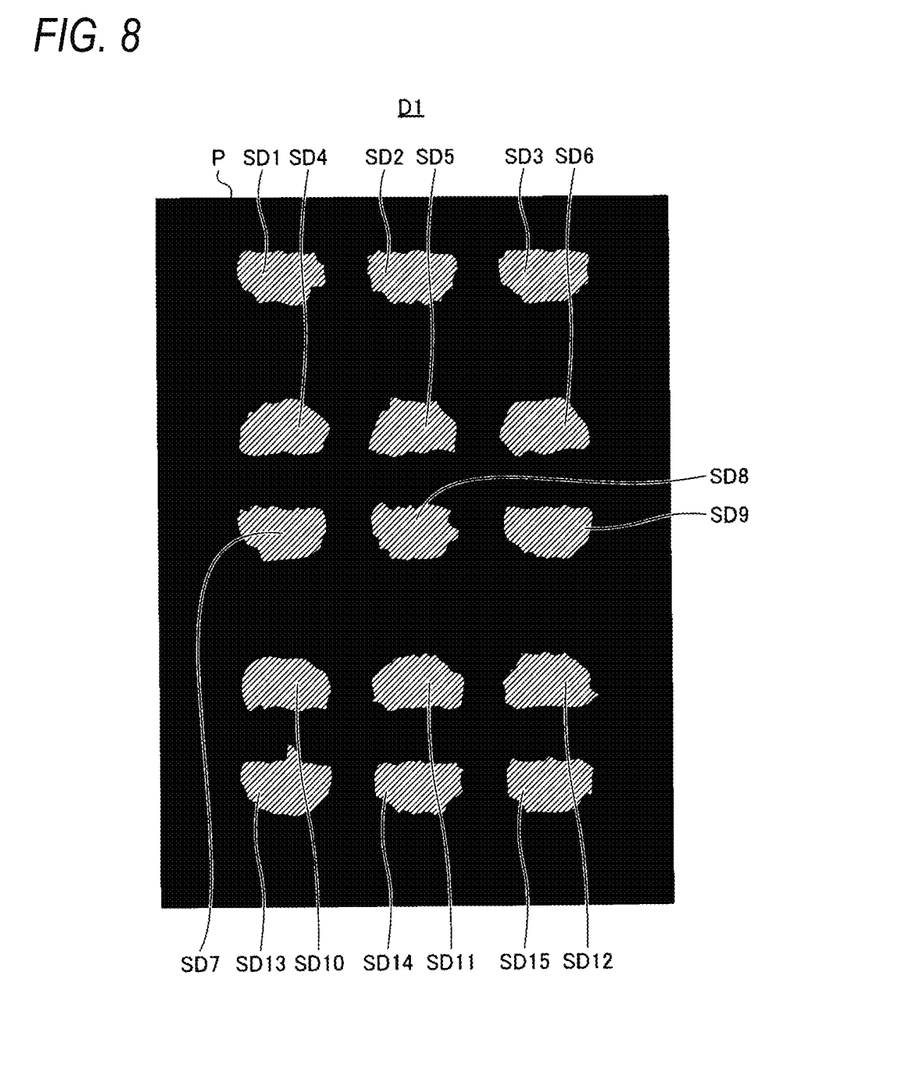
FIG. 8 is a diagram showing an example of inspection data according to the embodiment.

FIG. 8 shows inspection data D1 for determining the quality of the state of the cream solder printed on the substrate. In the inspection data D1, the shapes of the cream solder SD1 to SD15 are specified in detail. The image processing unit 77 stores the generated inspection data D1 into the storage unit 79. The determination unit 78 compares the image of the cream solder acquired by the image acquisition unit 76 with the inspection data D1 acquired from the storage unit 79, and determines the quality of the state of the cream solder.

[Inspection Method]

Figure 9:
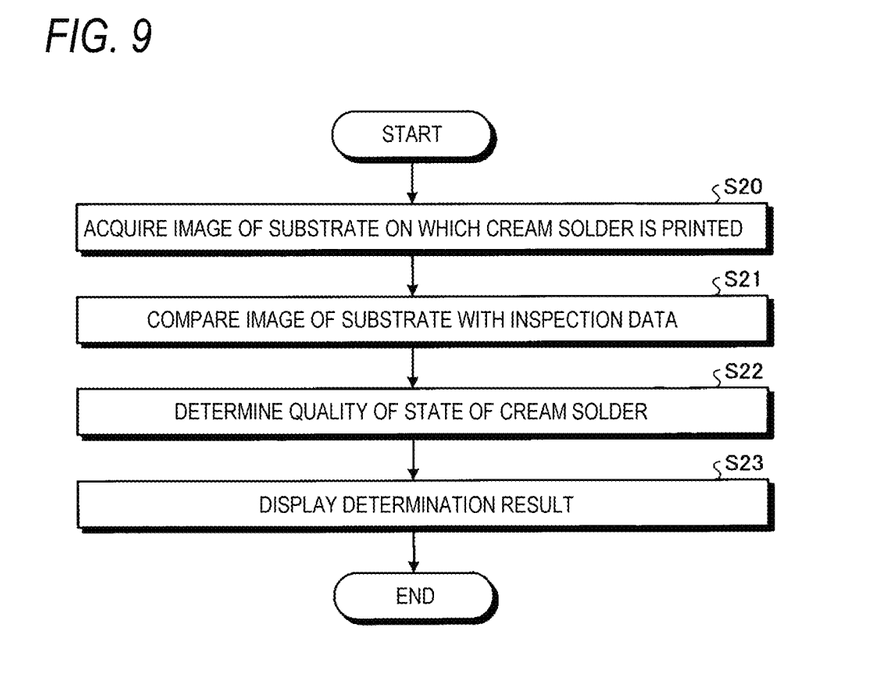
FIG. 9 is a flowchart showing an example of an inspection method according to an embodiment.

A method for inspecting the state of the cream solder printed on the substrate according to the embodiment will be described with reference to FIG. 9. FIG. 9 is a flowchart showing an example of the method for inspecting the state of the cream solder printed on the substrate according to the embodiment.

The image acquisition unit 76 acquires an image of the substrate on which the cream solder to be inspected is printed (step S20).

The determination unit 78 compares the image of the substrate on which the cream solder to be inspected is printed with the inspection data stored in the storage unit 79 (step S21). The determination unit 78 determines the quality of the state of the cream solder printed on the substrate based on the comparison result between the image of the substrate on which the cream solder to be inspected is printed and the inspection data stored in the storage unit 79 (step S22). The determination unit 78 determines that the state of the cream solder is good when a matching rate between the shape of the cream solder to be inspected and a corresponding cream solder shape included in the inspection data is equal to or greater than a predetermined ratio. The determination unit 78 determines that the state of the cream solder is bad when the matching rate between the shape of the cream solder to be inspected and the corresponding cream solder shape included in the inspection data is less than the predetermined ratio.

The display control unit 80 displays the determination result of the determination unit 78 on the display device 8 (step S23).

[Computer System]

Figure 10:
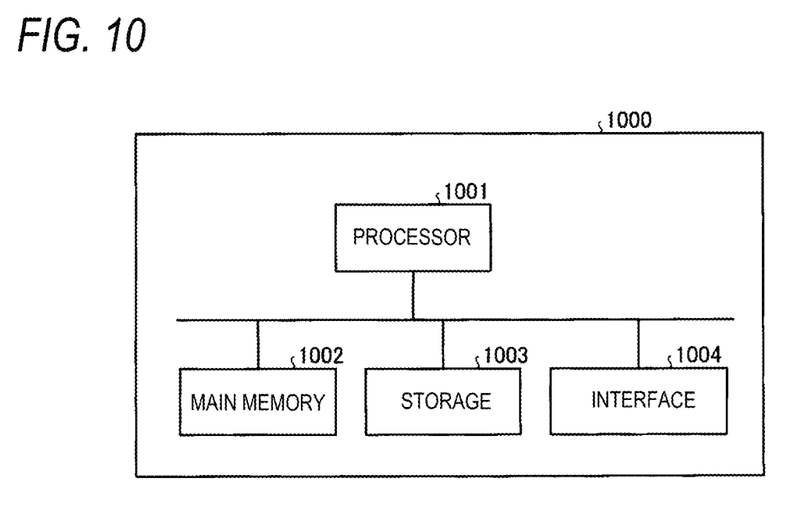
FIG. 10 is a block diagram showing a computer system according to the embodiment.

FIG. 10 is a block diagram showing a computer system 1000 according to the embodiment. The control device 7 described above includes the computer system 1000. The computer system 1000 includes a processor 1001 such as a Central Processing Unit (CPU); a main memory 1002 including a non-volatile memory such as a Read Only Memory (ROM) and a volatile memory such as a Random Access Memory (RAM); a storage 1003; and an interface 1004 including an input/output circuit. Functions of the control device 7 are stored in the storage 1003 as a program. The processor 1001 reads the program from the storage 1003, expands the program into the main memory 1002, and executes the above-described processing according to the program. The program may be distributed to the computer system 1000 via the network.

The program can cause the computer system 1000 to acquire images obtained by imaging, under at least two illumination conditions with different brightness, the solder normally printed on substrate P, and to extract the shape of the solder based on the difference in luminance between the acquired images so as to generate inspection data to be used for inspecting the state of the solder printed on the substrate P according to the embodiment described above.

As described above, the images obtained by imaging, under at least two illumination conditions with different brightness, the solder normally printed on the substrate P are acquired, the shape of the solder is specified based on the difference in brightness between the acquired images, and inspection data to be used for inspecting the state of the solder printed on the substrate is generated based on the specified shape of the solder. Thus, in the present embodiment, inspection data for determining the quality of the shape of the cream solder printed on the substrate can be automatically generated even when the design data is not available. Therefore, since the time required for the inspection process can be shortened, the work efficiency of the operator is improved.

OTHER EMBODIMENTS

In the above description, the illumination condition of the illumination light applied to the substrate on which the cream solder is printed during generation of the inspection data has been described as being an inclination angle of the illumination light, but the present invention is not limited thereto. The illumination condition may be, for example, brightness (light) of the illumination light. In this case, the control device 7 acquires, for example, images of a substrate on which cream solder is printed and which is irradiated under two different brightness. Then, the control device 7 specifies a shape of the solder based on a difference in brightness between the two acquired images, and generates, based on the shape of the solder, inspection data to be used for inspecting a state of the solder printed on the substrate.

What is claimed is:

1. An inspection device, comprising:
a camera that acquires images obtained by imaging, under at least two illumination conditions with different brightness, solder normally printed on a substrate, each illumination condition of the at least two illumination conditions using a different light source having a same color, each illumination condition emitting light when other illumination conditions of the at least two illumination conditions are not emitting light; and
a processor that specifies a shape of the solder based on a difference in brightness between the images acquired by the camera; and
generates, based on the shape of the solder, inspection data used for inspecting a state of the solder printed on the substrate.

2. The inspection device according to claim 1, wherein the camera acquires images of the solder irradiated with illumination light from at least two different inclination angles.

3. The inspection device according to claim 2, wherein the processor compares the inspection data with an image of solder printed on a substrate to be inspected so as to determine quality of a state of the solder printed on the substrate to be inspected.

4. The inspection device according to claim 2, wherein the processor generates a difference image based on a difference in luminance between the images acquired by the camera.

5. The inspection device according to claim 4, wherein the processor compares the inspection data with an image of solder printed on a substrate to be inspected so as to determine quality of a state of the solder printed on the substrate to be inspected.

6. The inspection device according to claim 4, wherein the processor performs binarization processing on the difference image to generate a binary image.

7. The inspection device according to claim 6, wherein the processor compares the inspection data with an image of solder printed on a substrate to be inspected so as to determine quality of a state of the solder printed on the substrate to be inspected.

8. The inspection device according to claim 6, wherein the processor extracts an edge of a region between the solder and the substrate based on the binary image, and specifies a shape of the solder based on the edge.

9. The inspection device according to claim 8, wherein the processor compares the inspection data with an image of solder printed on a substrate to be inspected so as to determine quality of a state of the solder printed on the substrate to be inspected.

10. The inspection device according to claim 1, wherein the processor generates a difference image based on a difference in luminance between the images acquired by the camera.

11. The inspection device according to claim 10, wherein the processor compares the inspection data with an image of solder printed on a substrate to be inspected so as to determine quality of a state of the solder printed on the substrate to be inspected.

12. The inspection device according to claim 10, wherein the processor performs binarization processing on the difference image to generate a binary image.

13. The inspection device according to claim 12, wherein the processor compares the inspection data with an image of solder printed on a substrate to be inspected so as to determine quality of a state of the solder printed on the substrate to be inspected.

14. The inspection device according to claim 12, wherein the processor extracts an edge of a region between the solder and the substrate based on the binary image, and specifies a shape of the solder based on the edge.

15. The inspection device according to claim 14, wherein the processor compares the inspection data with an image of solder printed on a substrate to be inspected so as to determine quality of a state of the solder printed on the substrate to be inspected.

16. The inspection device according to claim 1, wherein the processor compares the inspection data with an image of solder printed on a substrate to be inspected so as to determine quality of a state of the solder printed on the substrate to be inspected.

17. The inspection device according to claim 1, wherein the processor is configured to acquire a first image of the solder illuminated with the illumination light from a first inclination angle, and to acquire a second image of the solder illuminated with a same color illumination light as the illumination light from a second inclination angle different from the first inclination angle, and
the processor is configured to generate a difference image based on a difference in brightness between the first image and the second image.

18. An inspection method, comprising:
acquiring images obtained by imaging with a camera, under at least two illumination conditions with different brightness, solder normally printed on a substrate, each illumination condition of the at least two illumination conditions using a different light source having a same color, each illumination condition emitting light when other illumination conditions of the at least two illumination conductions are not emitting light; and specifying a shape of the solder based on a difference in brightness between the acquired images, and generating, based on the shape of the solder, inspection data used for inspecting a state of the solder printed on the substrate.

* * * * *